(12) United States Patent
Mokthar (10) Patent No.: US 8,851,807 B2
(45) Date of Patent: Oct. 7, 2014

(54) CUTTING TOOL HAVING AXIAL POSITION ADJUSTMENT ARRANGEMENT

(71) Applicant: Iscar Ltd., Tefen (IL)

(72) Inventor: Roohi Mokthar, Julis (IL)

(73) Assignee: Iscar, Ltd., Tefen (IL)

( * ) Notice: Subject to any disclaimer, the term of this patent is extended or adjusted under 35 U.S.C. 154(b) by 160 days.

(21) Appl. No.: 13/727,314

(22) Filed: Dec. 26, 2012

(65) Prior Publication Data

US 2014/0178136 A1    Jun. 26, 2014

(51) Int. Cl.
*B23C 5/20* (2006.01)
*B23C 5/24* (2006.01)
*B23C 5/08* (2006.01)
*B23B 27/16* (2006.01)

(52) U.S. Cl.
CPC ............... *B23C 5/08* (2013.01); *B23C 5/2486* (2013.01); *B23C 5/2406* (2013.01); *B23C 2270/06* (2013.01); *B23C 5/2493* (2013.01)
USPC ............................................. 407/41; 407/49

(58) Field of Classification Search
CPC ...... B23C 5/06; B23C 5/2239; B23C 5/2243; B23C 5/2252; B23C 2260/12
USPC ......... 407/23, 25, 29, 39, 41, 46, 48, 49, 101, 407/93, 94
See application file for complete search history.

(56) References Cited

U.S. PATENT DOCUMENTS

| | | | |
|---|---|---|---|
| 3,899,813 A * | 8/1975 | Lovendahl | 407/44 |
| 4,780,029 A | 10/1988 | Beck | |
| 5,395,186 A * | 3/1995 | Qvart | 407/46 |
| 6,056,484 A | 5/2000 | Mitchell | |
| 6,116,823 A * | 9/2000 | Mihic | 407/40 |
| 6,497,537 B1 | 12/2002 | Francis | |
| 7,086,812 B2 * | 8/2006 | Gamble et al. | 407/46 |
| 7,118,311 B2 * | 10/2006 | Astrom | 407/46 |

(Continued)

FOREIGN PATENT DOCUMENTS

| | | |
|---|---|---|
| DE | 3936243 | 5/1991 |
| DE | 10011113 | 9/2001 |
| EP | 0355305 A2 | 2/1990 |

OTHER PUBLICATIONS

International Search Report dated Apr. 15, 2014 issued in PCT counterpart application (No. PCT/IL2013/051016).

(Continued)

*Primary Examiner* — Will Fridie, Jr.
(74) *Attorney, Agent, or Firm* — Womble Carlyle (57) ABSTRACT

A cutting tool has a plurality of cutting portions located along a cutter peripheral surface, alternating between cutter side surfaces, with a cutting insert retained in each cutting portion. At least one cutting portion has a main recess, formed opposite of the respective cutting insert. The main recess has a recess arcuate surface and a recess bearing surface. The cutting portion also has a cam member with a cam arcuate surface and a cam bearing surface, located on different sides of a cam pivot axis. The cam member is located within the main recess, the cam arcuate surface being adjacent the recess arcuate surface and the cam bearing surface being adjacent the recess bearing surface. The cutting portion is moveable between a neutral position and an adjusted position, in which the axial position of the cutting insert is adjusted when the cam member is rotated about the cam pivot axis.

13 Claims, 5 Drawing Sheets

(56) References Cited

U.S. PATENT DOCUMENTS

| | | |
|---|---|---|
| 7,121,769 B2 | 10/2006 | Satran |
| 7,189,031 B2 * | 3/2007 | Bellinger et al. ............... 407/40 |
| 7,600,951 B2 * | 10/2009 | Van Horssen ................... 407/70 |
| 7,802,945 B2 | 9/2010 | Sheffler |
| 8,061,937 B2 | 11/2011 | Koskinen |
| 8,091,205 B2 * | 1/2012 | Kadosh ........................... 29/468 |
| 2003/0202848 A1 | 10/2003 | Gamble et al. |
| 2004/0161311 A1 | 8/2004 | Satran et al. |
| 2011/0097166 A1 | 4/2011 | Kadosh et al. |

OTHER PUBLICATIONS

"Advertisement" Werkstatt Und Betrieb, Carl Hanser Verlag Gmbh & Co. KG, DE, vol. 124, No. 5, May 1, 1991, p. A87, XP000204877, ISSN: 0043-2792.

* cited by examiner

CUTTING TOOL HAVING AXIAL POSITION ADJUSTMENT ARRANGEMENT

FIELD OF THE INVENTION

The present invention relates to cutting tools having a plurality of cutting inserts retained circumferentially thereon, in general, and to such cutting tools with arrangements for adjusting the axial position of the cutting inserts, in particular.

BACKGROUND OF THE INVENTION

Cutting tools such as slotting cutters have a plurality of cutting inserts located at their circumference. The cutting inserts may be arranged along the periphery of the cutting tool, alternating between different sides of the tool body. Such cutting tools have a width of cut, determined by the axial span of the cutting edges of two adjacent cutting inserts. It is, therefore, possible to control the width of cut of the cutting tool by controlling the axial position of each cutting insert.

Cutting tools with cutting inserts arranged as described above, or having means for controlling the position of the cutting inserts, are shown, for example, in German Patent Publication No. DE 3936243, German Patent Publication No. DE 10011113, U.S. Pat. No. 4,780,029, U.S. Pat. No. 6,056,484, U.S. Pat. No. 6,497,537, U.S. Pat. No. 7,121,769, U.S. Pat. No. 7,802,945 and U.S. Pat. No. 8,061,937.

It is an object of the subject matter of the present application to provide an improved novel cutting tool, having arrangements for adjusting the axial position of the cutting inserts, and controlling the width of cut of the cutting tool.

SUMMARY OF THE INVENTION

In accordance with the subject matter of the present application, there is provided a cutting tool having an axis of rotation and comprising:
  a cutter body, having two cutter side surfaces and a cutter peripheral surface extending therebetween;
  a plurality of circumferentially spaced apart cutting portions located along the cutter peripheral surface, each cutting portion comprising an insert pocket for retaining a cutting insert, wherein the insert pockets of two adjacent cutting portions are formed alternately on different cutter side surfaces;
  wherein at least one said cutting portion comprises:
    a main recess, formed on the cutter side surface opposite of the respective insert pocket, and having a recess arcuate surface and a recess bearing surface located across from the recess arcuate surface; and
    an axial position adjustment arrangement, comprising:
      a cam member having a cam arcuate surface and a cam bearing surface, located on different sides of a cam pivot axis, the cam member being located within the main recess with the cam arcuate surface adjacent the recess arcuate surface and the cam bearing surface adjacent the recess bearing surface, and
  wherein the at least one cutting portion is moveable between a neutral position and an adjusted position, and in the adjusted position of one of the at least one cutting portion, the axial position of the cutting insert is adjusted when the cam member is rotated about the cam pivot axis in a first direction.

In accordance with an embodiment of the present application, in the cutting tool described above, in each of the at least one cutting portions:

a tightening screw bore extends between, and opens out to, the cutter peripheral surface and to the main recess, spaced apart from the recess bearing surface,
  a tightening screw is disposed in the tightening screw bore along a screw axis, and
  in the adjusted position, the tightening screw advances into the tightening screw bore along the screw axis.

In accordance with a further embodiment of the present application, in the adjusted position of one of the cutting portions, the cam bearing surface presses against the recess bearing surface, inducing axial movement of the respective cutting insert.

BRIEF DESCRIPTION OF THE DRAWINGS

For a better understanding of the present invention and to show how the same may be carried out in practice, reference will now be made to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Figure 1:
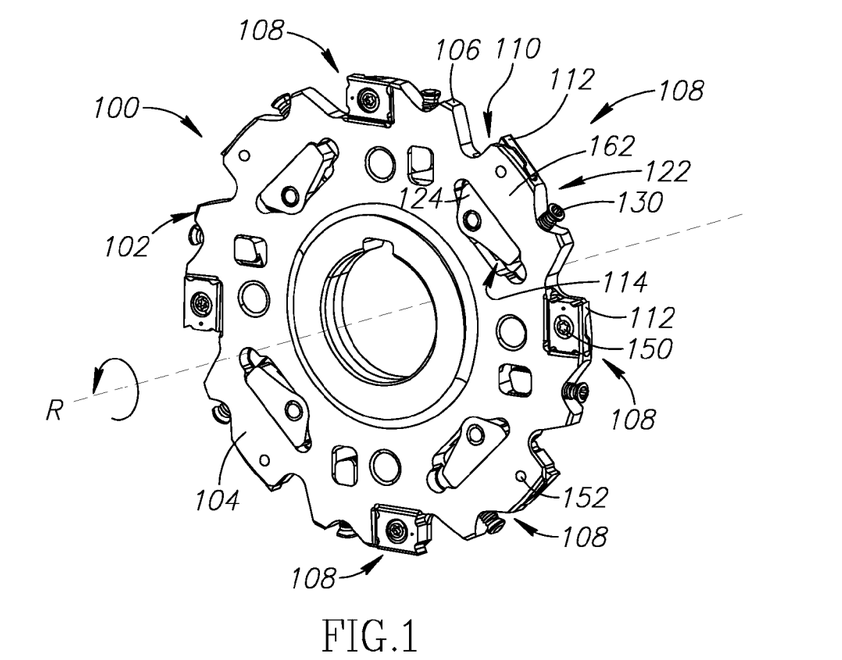
FIG. 1 is a schematic illustration of a cutting tool according to an embodiment of the disclosed technique.
Figure 2:
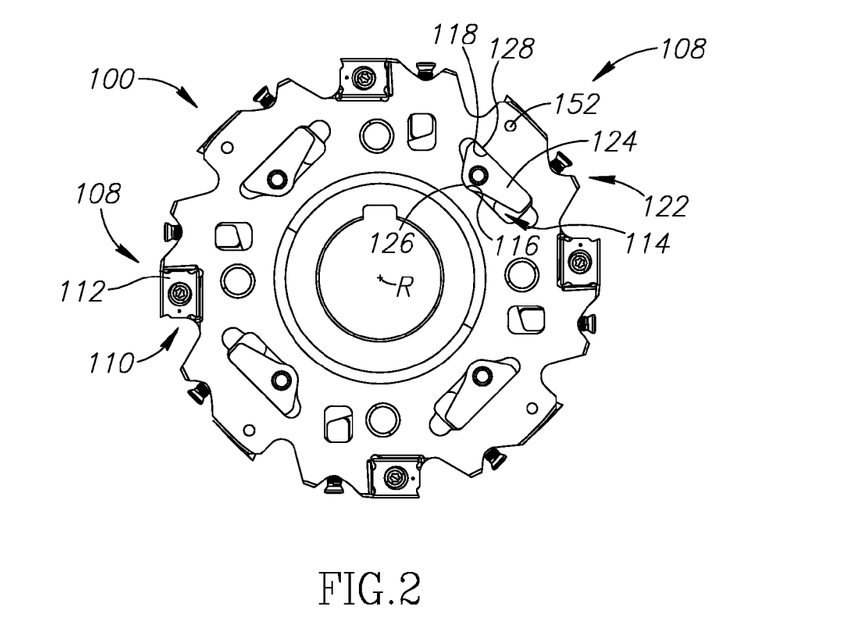
FIG. 2 is a side view of the cutting tool of FIG. 1.
Figure 10:
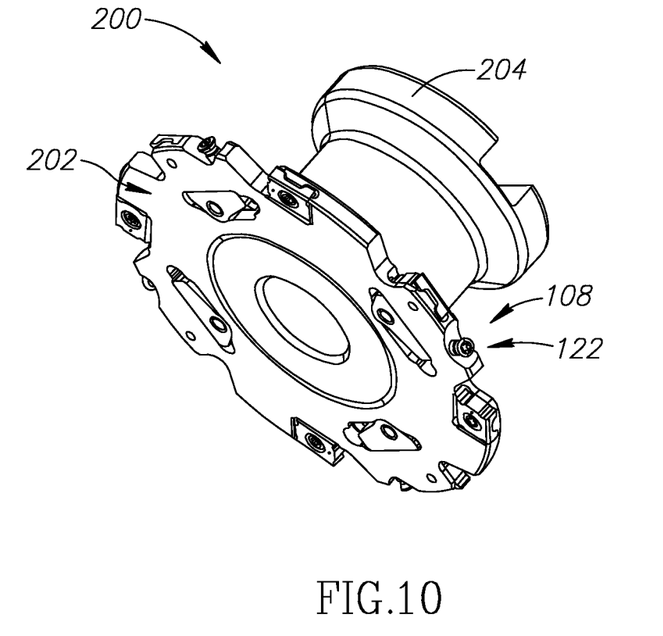
FIG. 10 is a perspective view of a cutting tool in accordance with another embodiments of the disclosed technique.
Figure 11:
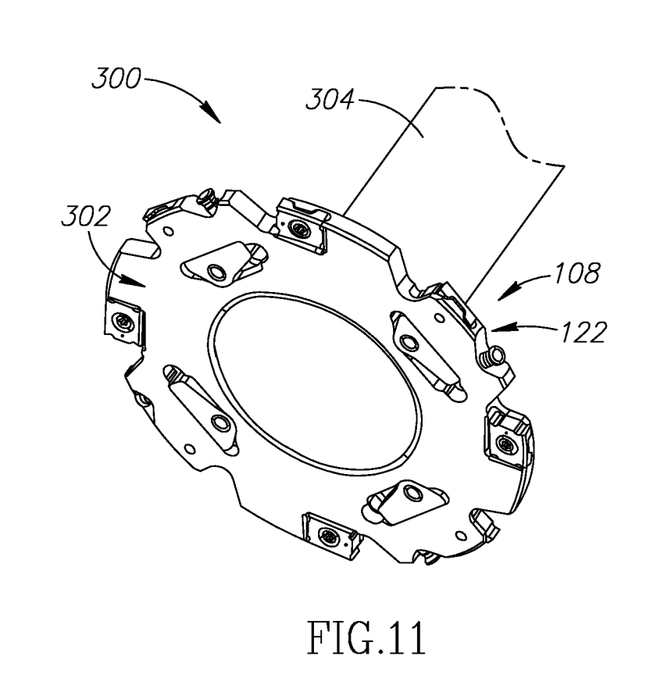
FIG. 11 is a perspective view of a cutting tool in accordance with a further embodiment of the disclosed technique.

Reference is made to FIGS. 1 and 2, depicting perspective side views of a cutting tool 100, in accordance with the present invention. The cutting tool 100 has an axis of rotation R, around which the cutting tool 100 rotates when employed in metal cutting operations, such as slot cutting. The cutting tool 100 comprises a cutter body 102, which has two cutter side surfaces 104 and a cutter peripheral surface 106 extending therebetween. The cutter body 102 is disc-shaped, and the cutting tool 100 is a disc-shaped slotting cutter. However, the present invention may be similarly employed with other types of tools, as depicted in FIGS. 10-11, and elaborated with reference thereto. It is noted that the term "slotting cutter" as used herein may be replaced with other terms applicable in the metal cutting field for such cutting tools, for example, "slot milling cutter", "slitting cutter", "grooving cutter", "slot mill cutter", "groove milling cutter", "side milling cutter", "disc milling cutter", and the like.

A plurality of circumferentially spaced apart cutting portions 108 are located along the cutter peripheral surface 106, alternating on different cutter side surfaces 104. Each cutting portion 108 has an insert pocket 110, formed on a first one of the tool side surfaces 104, suitable for receiving and retaining a cutting insert 112 therein.

Figure 3:
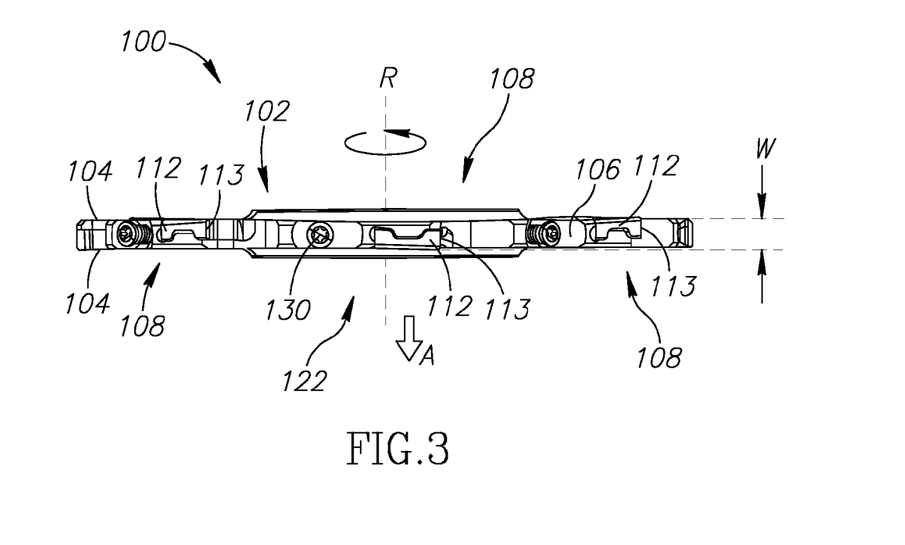
FIG. 3 is a circumferential view of the cutting tool of FIG. 1.
Figure 4:
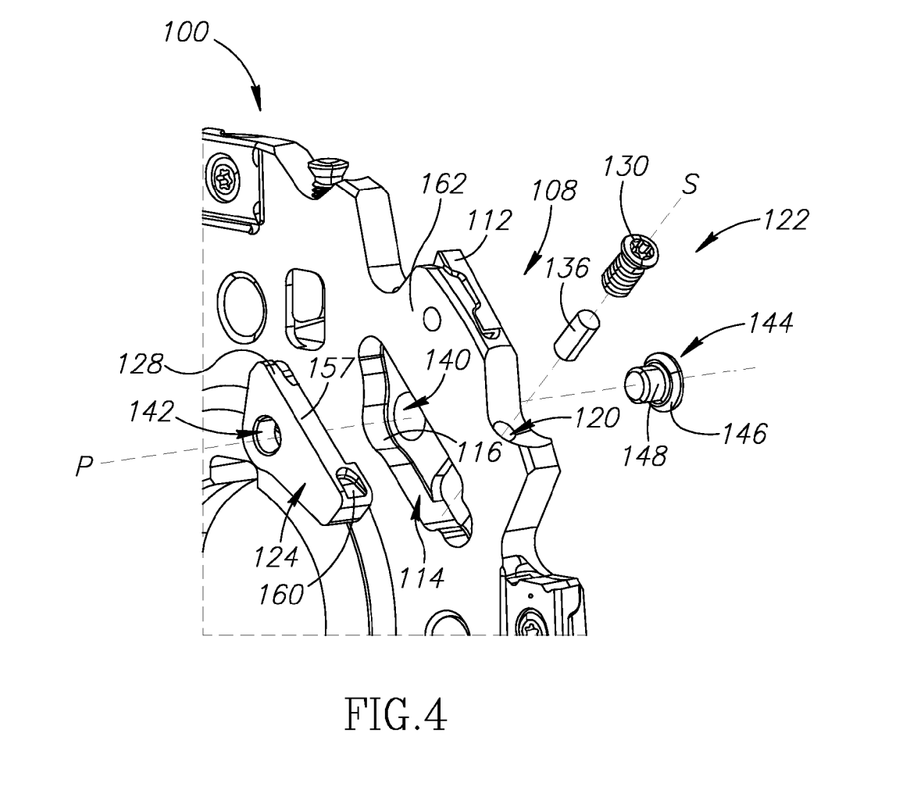
FIG. 4 is an exploded perspective view of a cutting portion of the cutting tool of FIG. 1.

With further reference to FIGS. 1-3, the cutting insert 112 is firmly retained in the insert pocket 110, for example, by an insert screw 150, interacting with an insert screw bore 152. The insert screw bore 152 may open out to the cutter side surface 104 opposite of the insert pocket 110 (as depicted in FIGS. 1 and 2). The cutting insert 112 has a cutting edge 113. When the cutting insert 112 is retained in the insert pocket 110, the cutting edge 113 assumes an axial position, i.e., in a direction parallel to the axis of rotation R.

At least one of the cutting portions 108 comprises an axial position adjustment arrangement 122. As depicted in FIGS. 1-7, all of the cutting portions 108 of the cutting tool 100 comprise axial position adjustment arrangements 122. However, it should be understood that, alternatively, only cutting portions 108 with insert pockets 110 located on the same cutter side surface 104 may comprise axial position adjustment arrangements 122. Further alternatively, only selected cutting portions 108 may comprise axial position adjustment arrangements 122.

The at least one cutting portion 108 having the axial position adjustment arrangement 122 also has a main recess 114 formed on the cutter side surfaces 104 opposite of the respective insert pocket 110 (i.e., the insert pocket 110 of the same cutting portion 108). The main recess 114 has a recess arcuate surface 116 and an opposite recess bearing surface 118. The main recess 114 is spaced apart from the insert pocket 110 towards the axis of rotation R. A resilient portion 162 is located between the main recess 114 and the cutter peripheral surface 106. A tightening screw bore 120 extends between, and opens out to, the cutter peripheral surface 106 and the main recess 114, spaced apart from the recess bearing surface 118. The tightening screw bore 120 extends along a screw axis S.

Each axial position adjustment arrangement 122 comprises a cam member 124 and a tightening screw 130. The tightening screw 130 is disposed in the tightening screw bore 120 along the screw axis S. The adjustment arrangements 122 may further include a lever pin 136. The cam member 124 has a cam pivot axis P parallel to the axis of rotation R of the cutting tool 100. The cam member 124 has a cam arcuate surface 126 and an opposite cam bearing surface 128. The cam arcuate surface 126 subtends a first angle α (see FIG. 5). In a particular embodiment, the first angle α may be an approximately 85° angle. However, the first angle α may be a different angle, determined according to the available space and the structure of the cutting tool and cam member. The cam pivot axis P may be located at the center of the cam arcuate surface 126. The recess arcuate surface 116 is formed with suitable shape and size for the cam arcuate surface 126 to fit therein.

Figure 8:
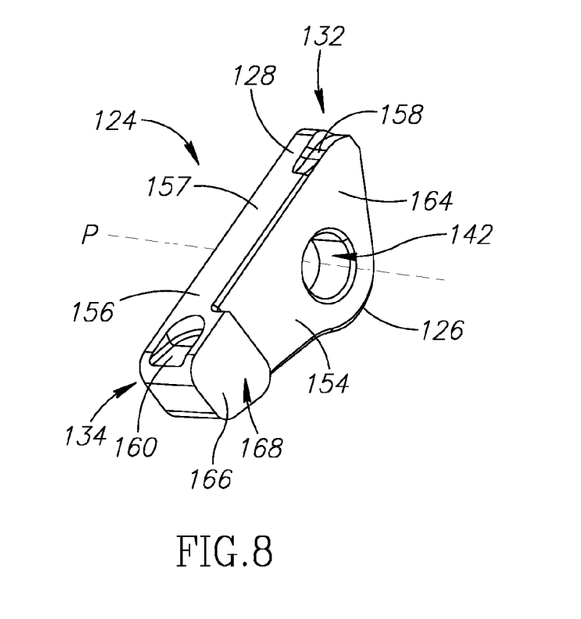
FIG. 8 is a perspective view of a cam member of the cutting tool of FIG. 1.
Figure 9:
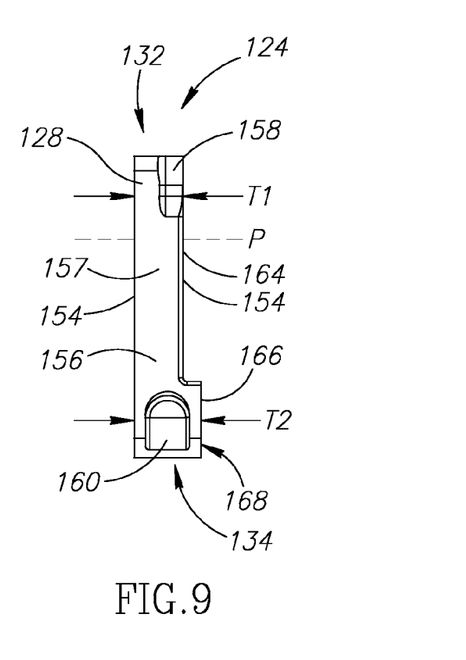
FIG. 9 is a top view of the cam member of FIG. 8.

With further reference to FIGS. 8 and 9, the cam member 126 has two cam side surfaces 154 and a cam peripheral surface 156 extending therebetween. The cam side surfaces 154 are spaced apart from one another along the cam pivot axis P. The cam bearing surface 128 is a part of the cam peripheral surface 156. In some embodiments, the cam bearing surface 128 extends along a portion of the cam peripheral surface 156, along the cam pivot axis P. The portion of the cam peripheral surface 156 adjacent the cam bearing surface 128 is indented towards the cam pivot axis P, forming a cam bearing indent 158. In this manner, the cam bearing surface 128 contacts the recess bearing surface 118 adjacent the cutter side surface 104, in which the main recess 114 is formed. This is order to apply a force as closer as possible to this cutter side surface 104, which would better induce axial deflection of the resilient portion 162, as will be discussed herein below.

Further, the cam member 124 has a first end 132 and a second end 134, spaced apart in a direction transverse to the cam pivot axis P. The cam arcuate surface 126 and the cam bearing surface 128 are located on the cam peripheral surface 156 at the first end 132. A lever contact surface 160 is formed on the cam peripheral surface 156 at the second end 134. A planar portion 157 is located between the cam bearing surface 128 and the lever contact surface 160. The cam member 126 may further have a cam grip opening 142 extending parallel to the cam pivot axis P, and opening out to one or both of the cam side surfaces 154. In the embodiment of FIG. 8, the cam grip opening 142 extends along the cam pivot axis P and opens out to both cam side surfaces 154.

Figure 5:
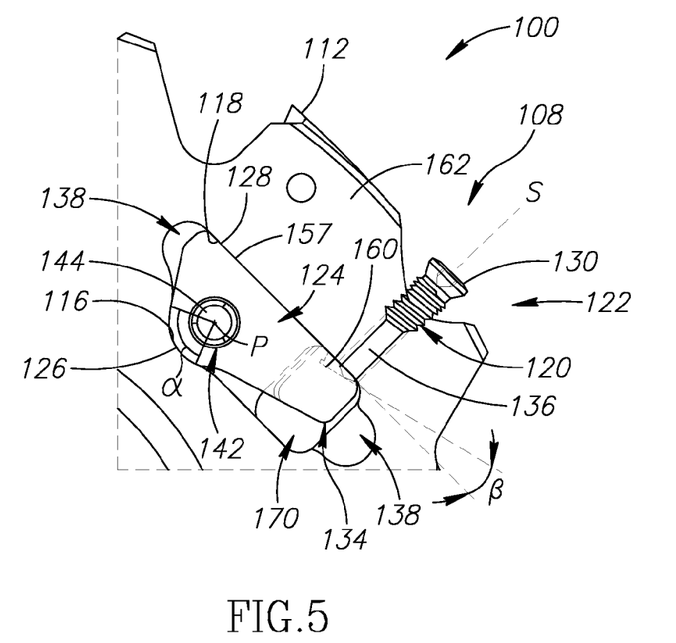
FIG. 5 is a partially transparent side view of a cutting portion of the cutting tool of FIG. 1, in the neutral position.
Figure 6:
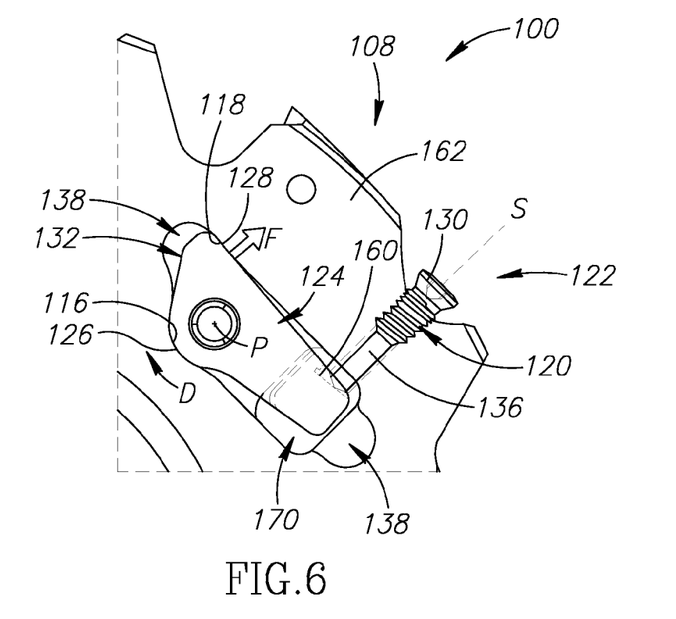
FIG. 6 is a partially transparent side view of a cutting portion of the cutting tool of FIG. 1, in the adjusted position.

Reference is further made to FIGS. 5 and 6, depicting one of the cutting portions 108 of the cutting tool 100. Each cutting portion 108 of the cutting tool 100 is moveable between a neutral position (FIG. 5) and an adjusted position (FIG. 6). The cam member 124 is located within the main recess 114 with the cam arcuate surface 126 placed against the recess arcuate surface 116 and the cam bearing surface 128 placed against the recess bearing surface 118. The lever pin 136 is located in the tightening screw bore 120, along the screw axis S, between the tightening screw 130 and the main recess 114.

In the neutral position (FIG. 5), the tightening screw 130 does not apply a force on the second end 134 of the cam member 124. Thus, the resilient portion 162 and the cutting insert 112 of the cutting portion 108 are also in their neutral (i.e., not adjusted) axial position.

The cutting tool 100 is generally employed for cutting in a metal work piece. The width of cut W (i.e., slot width W, FIG. 3), is determined by the axial extent of the cutting edges 113 of two neighboring cutting inserts 112 (i.e., in a direction parallel to the axis of rotation R). Controlling the width of cut W of the cutting tool 100 may be achieved by adjusting the axial position of each cutting edge 113. In the adjusted position (FIG. 6) of one of the cutting portions 108, the axial position of the cutting insert 112 is adjusted when the cam member 124 is rotated about the cam pivot axis P, as will be elaborated herein below. It should be noted that it is not mandatory to adjust the axial position of all the cutting inserts 112, even if the respective cutting portion 108 includes an axial position adjustment arrangement 122 (i.e., it is possible to adjust the axial position of a portion of the cutting inserts 112).

When the tightening screw 130 threadingly engages the tightening screw bore 120, it presses on the lever pin 136, along the screw axis S. The lever pin 136 then presses on the cam member 124, at the second end 134 thereof. This induces the cam member 124 to rotate about the cam pivot axis P in a first direction D, such that the cam bearing surface 128 presses against the recess bearing surface 118. The cam bearing surface 128 thus applies a force on the recess bearing surface 118, having a force component F, parallel to the screw axis S.

The force applied on the recess bearing surface 118 induces axial deflection of the resilient portion 162 and the insert pocket 110, and thus of the cutting insert 112. This deflection is indicated by an arrow A in FIG. 3. The main recess 114 is formed only on one of the cutter side surfaces 104 (i.e., it is not a through recess), and this cutter side surface 104 is weakened, making it more flexible under mechanical forces. Further, in some embodiments, the main recess 114 may have two opposite extensions forming opposite resilience recesses 138 (i.e., adjacent the first and second ends 132, 134 of the cam member 124). These resilience recesses 138 also provide flexibility to the resilient portion 162 in order to deflect in the axial direction.

It is noted that the lever pin 136 located between the tightening screw 130 and the cam member 124 allows for the use of a shorter tightening screw 130, instead of a long tightening screw which would reach the cam member 124 and press directly thereon. Additionally, in the adjusted position (FIG. 6), a portion of the lever pin 136 is exposed to the space of the main recess 114. When a long tightening screw is employed, a portion of that screw is exposed to the main recess 114. In order to prevent possible damage to the threading end of the tightening screw (e.g., breakage, contact with removed metal chips, etc.), the lever pin 136 is added, thereby keeping the entire threading portion of the tightening screw 130 protected within the tightening screw bore 120.

Each of the cutting portions 122 may further include a cutter grip opening 140 which opens out to the cutter side surface 104 adjacent the insert pocket 110 and to the main recess 114. The cam member 124 has a cam grip opening 142 extending parallel to the cam pivot axis P. When the cam member 124 is in the main recess 114, the cutter grip opening 140 also extends parallel to the cam pivot axis P, and opens out towards the cam grip opening 142. The cutter grip opening 140 is larger than the cam grip opening 142. In order to prevent the cam member 124 from falling out of the main recess 114, a grip pin 144 having a head portion 146 and a grip portion 148, is inserted through the cutter grip opening 140, such that the grip portion 148 is inserted into the cam grip opening 142. The grip portion 148 forms a press fit with the cam grip opening 142, thereby gripping the cam member 124. Such press fit is possible, for example, when the diameter of the grip portion 148 is slightly larger, at least in some portions thereof, than the diameter of the cam grip opening 142. In particular, the grip portion 148 may be formed of three arcuate portions having similar radii, forming a rounded triangle-like shape, which is suitable for achieving a three-point press fit with the cam grip opening 142. The diameter of the head portion 146 of the grip pin 144 is larger than the cutter grip opening 140, such that the head portion 146 is stopped against the cutter side surface 104 opposite of the main recess 114.

When the cam member 124 is rotated, a bending torque force may be applied on the grip pin 144. The grip pin 144 may tend to bend or break under such a torque force, in particular when formed in small dimensions. To this end, the cam grip opening 142 and the cutter grip opening 140 may be located along the cam pivot axis P (i.e., coincide therewith), as shown in the accompanying drawings. In this case, the grip pin 144 rotates along with the cam member 124, and the torque applied on the grip pin 144 is eliminated, providing further durability to the axial position adjustment arrangement 122.

A side view of the cam member 124, viewed along the cam pivot axis P, is depicted in FIG. 5. According to an embodiment of the present invention, and as depicted in this view, the lever contact surface 160 may be tilted by a second angle β relative to the planar portion 157, tilting towards the cam pivot axis P. In particular, the second angle β may be a 15° angle. When the tightening screw 130 pushes down on the lever contact surface 160, either directly or through the lever pin 136, the lever contact surface 160 is tilted to ensure that there is a sufficient force component in order to rotate the cam member 124 in the first direction D. The lever contact surface 160 also serves to guide the lever pin 136 towards the cam pivot axis P, thereby preventing it from sliding in a direction away from the cam pivot axis P, when the cam member 124 is rotated.

According to an embodiment of the present invention, the cam side surface 154 which is located inside the main recess 114, includes a first side portion 164 extending adjacent the first end 132 of the cam member 124, and a second side portion 166 extending adjacent the second end 134 of the cam member 124. The cam side surfaces 154 are substantially parallel to one another and define a cam member thickness therebetween. As indicated in FIG. 9, the cam member has a first cam member thickness T1 at its first end 132 (i.e., between the first side portion 164 and the other cam side surface 154), and a second cam member thickness T2 at its second end 134 (i.e., between the second side portion 166 and the other cam side surface 154). The second cam member thickness T2 is larger than the first cam member thickness T1 (i.e., T2>T1), such that the second end 134 of the cam member 124 is thicker than the first end 134, forming a cam protrusion 168. Thickening the second end 134 of the cam member 124 allows for a larger lever contact surface 160, which contributes to the durability of the cam member 124 under the force applied thereon by the lever pin 136.

Figure 7:
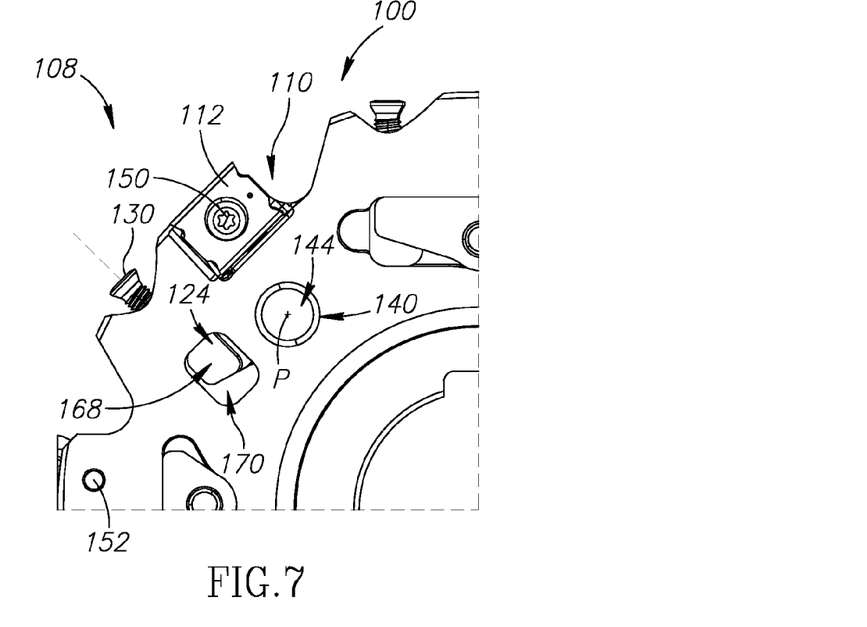
FIG. 7 is another side view of a cutting portion of the cutting tool of FIG. 1.

In this latter embodiment, and as depicted in FIGS. 5-7, an aperture 170 is formed in the cutter body 102, opening out to the main recess 114 and to the opposite cutter side surface 104. The aperture 170 is located adjacent to the tightening screw bore 120, and extends parallel to the cam pivot axis P. The aperture 170 is formed to allow insertion thereto of the protrusion 168 of the cam member 124, in the neutral position as well as in the adjusted position of the axial position adjustment arrangement 122.

The axial position adjustment arrangement 122 of the present invention may be employed with various types of cutting tools. Reference is made to FIGS. 10 and 11, depicting the present invention employed on different cutting tools. In FIG. 10, a cutting tool 200 is a flange-type slotting cutter, which has a cutter body 202, and a flange portion 204. The cutter body 202 and the flange portion 204 are integrally formed in one-piece unitary construction. The cutter body 202 has a plurality of cutting portions 108, at least one of which has an axial position adjustment arrangement 122, as described herein above with reference to the first embodiment of the present invention.

In FIG. 11, a cutting tool 300 is a T-type slotting cutter, which has a cutter body 302, and a shank portion 304. The cutter body 302 and the shank portion 304 are integrally formed in one-piece unitary construction. The cutter body 302 has a plurality of cutting portions 108, at least one of which has an axial position adjustment arrangement 122, as described herein above with reference to the first embodiment of the present invention.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

The invention claimed is:

1. A cutting tool (100) having an axis of rotation (R) and comprising:
   a cutter body (102), having two cutter side surfaces (104) and a cutter peripheral surface (106) extending therebetween;
   a plurality of circumferentially spaced apart cutting portions (108) located along the cutter peripheral surface (106), each cutting portion (108) comprising an insert pocket (110) for retaining a cutting insert (112), the insert pockets (110) of two adjacent cutting portions (108) being formed alternately on different cutter side surfaces (104);
   wherein at least one cutting portion (108) comprises:
      a main recess (114), formed on the cutter side surface (104) opposite of the respective insert pocket (110), and having a recess arcuate surface (116) and a recess bearing surface (118) located across from the recess arcuate surface (116); and
      an axial position adjustment arrangement (122), comprising a cam member (124) having a cam arcuate surface (126) and a cam bearing surface (128), located on different sides of a cam pivot axis (P), the cam member (124) being located within the main recess (114) with the cam arcuate surface (126) adjacent the recess arcuate surface (116) and the cam bearing surface (128) adjacent the recess bearing surface (118); and
   wherein the at least one cutting portion (108) is moveable between a neutral position and an adjusted position, and in the adjusted position of one of the at least one cutting portion (108), the axial position of the cutting insert (112) is adjusted when the cam member (124) is rotated about the cam pivot axis (P) in a first direction (D).

2. The cutting tool (100) according to claim 1, wherein in each of the at least one cutting portions (108):
   a tightening screw bore (120) extends between, and opens out to the cutter peripheral surface (106) and to the main recess (114), spaced apart from the recess bearing surface (118),
   a tightening screw (130) is disposed in the tightening screw bore (120) along a screw axis (S), and
   in the adjusted position, the tightening screw (130) advances into the tightening screw bore (120) along the screw axis (S).

3. The cutting tool (100) according to claim 1, wherein in the adjusted position of one of the cutting portions (108), the cam bearing surface (128) presses against the recess bearing surface (118), inducing axial movement of the respective cutting insert (112).

4. The cutting tool (100) according to claim 1, wherein the cam pivot axis (P) is located at the center of the cam arcuate surface (126).

5. The cutting tool (100) according to claim 1, wherein the cam pivot axis (P) is parallel to the axis of rotation (R).

6. The cutting tool (100) according to claim 1, wherein all of the cutting portions (108) with insert pockets (110) located on the same cutter side surfaces (104) comprise axial position adjustment arrangements (122).

7. The cutting tool (100) according to claim 1, wherein all of the cutting portions (108) of the cutting tool (100) comprise axial position adjustment arrangements (122).

8. The cutting tool (100) according to claim 1, wherein the cutter body (102) is disc-shaped.

9. The cutting tool (100) according to claim 2, wherein in each axial position adjustment arrangement (122):
   the cam member (124) has a first end (132) and a second end (134), the cam arcuate surface (126) and the cam bearing surface (128) being located at the first end (132), and
   in the adjusted position of one of the cutting portions (108), the tightening screw (130) of that cutting portion (108) pushes the second end (134) of the cam member (124) towards the axis of rotation (R), rotating the cam member (124) about the cam pivot (P) in the first direction (D).

10. The cutting tool (100) according to claim 2, wherein each axial position adjustment arrangement (122) further comprises a lever pin (136), located in the tightening screw bore (120), along the screw axis (S), between the tightening screw (130) and the cam member (124).

11. The cutting tool (100) according to claim 1, wherein in each of the at least one cutting portion (108), the main recess (114) has two extensions on opposite sides of the recess bearing surface (118), forming opposite resilience recesses (138).

12. The cutting tool (100) according to claim 1, wherein:
   each of the at least one cutting portion (108) further comprises a cutter grip opening (140) opening out to the cutter side surface (104) of the insert pocket (110) and to the main recess (114), extending parallel to the cam pivot axis (P),
   each cam member (124) has a cam grip opening (142) extending parallel to the cam pivot axis (P), and
   a grip pin (144) has a grip portion (148) passing through the cutter grip opening (140), and forming a press fit with the cam grip opening (142).

13. The cutting tool (100) according to claim 12, wherein the cutter grip opening (140) is located along the cam pivot axis (P).

* * * * *